April 3, 1956
J. LATZEN
2,740,649
BALL AND SOCKET JOINTS
Filed Aug. 15, 1950
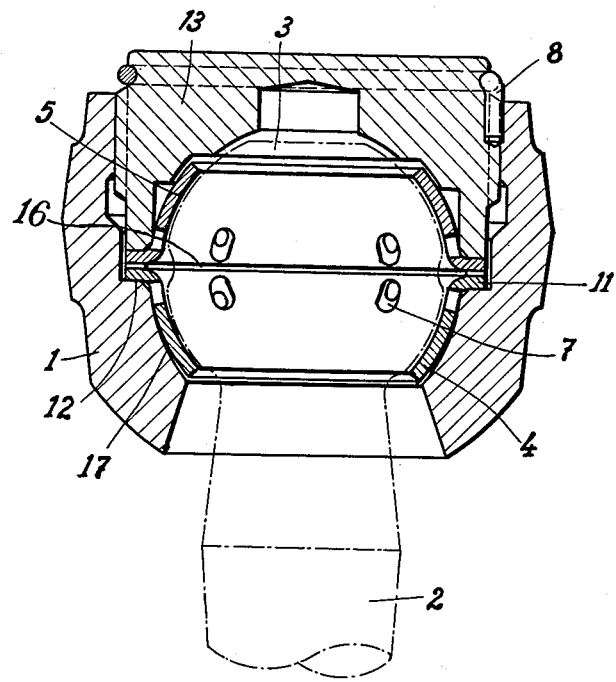
INVENTOR
JOSEF LATZEN
BY Robert H. Jacob.
AGENT

United States Patent Office 2,740,649
Patented Apr. 3, 1956

2,740,649

BALL AND SOCKET JOINTS

Josef Latzen, Dusseldorf-Oberkassel, Germany, assignor to A. Ehrenreich & Cie., Dusseldorf-Oberkassel, Germany, a firm Application August 15, 1950, Serial No. 179,540

2 Claims. (Cl. 287—87)

This invention relates to rod joints of the ball and socket type, widely used in mechanism and devices of various design, e. g. in the steering, governing, reversing gear and like controlling devices of wheeled vehicles, steam engines, water turbines, etc. and more especially to supplemental improvements in ball and socket joints, dealt with in co-pending United States patent applications of mine.

In those applications, ball and socket joints are disclosed, in the housing of which ball bearing means are embedded intermediate the inner walls of the housing and the ball, whereby significant economical advantages such as reduction of manufacturing costs and risks are obtained, and whereby drawbacks formerly incurred have been eliminated.

This invention aims at amplifying and enlarging the good results obtained heretofore by embodying supplemental structural and working improvements in ball and socket joints of the type concerned, which are set forth in the following specification and will be more fully understood from the accompanying drawing, which is a vertical sectional view taken through an improved socket joint in accordance with the invention.

The principal object of this invention was to provide a highly wear resistive, dirt and rain proof ball and socket joint, which can be manufactured under conditions of economy, subjected to strenuous working conditions, and which will remain truly safe and reliable, rendering continuous exact services in the transmission of high loads with very little care and attendance required for inspection, lubrication and repair.

Other objects in view and advantages obtained will become apparent hereinafter.

According to this invention and as illustrated in the drawing elastic ball bearing means are fixed in the housing 1, resiliently embracing and supporting the ball 3 at the end of rod 2 under pressure; said ball bearing means comprise hemispherical segmental caps or shells, viz. an upper shell 5, in engagement with the upper or northern hemisphere of the ball or globe, and a lower shell 4 in engagement with its southern hemisphere; the shells are flanged circumferentially at 11, and are fixed in the housing, spaced from each other, by one or more spacing rings 16 and are spaced from the excavated inner walls of the housing as seen at 17.

Slots extending meridionally into the shells may be formed therein, so as to enhance or condition their elastic properties, and to provide passages for lubricating matter stored in the cavities 17; instead of said slots or in addition thereto passages for lubrication may be provided, such as oblong holes 7.

The lower shells 4 rest with their flanges 11, on recesses 12, in the housing, and both shells superimposed therein, are fixed and clamped together by screw caps 13, which engage the flanges under pressure; nut locks of any convenient design, such as indicated at 8, may be provided for securing the screw cap in its proper position.

Various structural modifications and changes may be conveniently made and supplemental, subsidiary features may be added to ball and socket joints shown and described, without departing from the spirit and the salient features of this invention.

What I claim is:

1. A ball and socket joint comprising a ball headed rod, a housing enclosing the ball head and defining a recessed portion presenting a shoulder proximate the equatorial region of the ball, a lower spherical surface having a bottom aperture permitting angular movement of said rod and having a substantially greater spherical diameter than said ball head and being spaced therefrom, resilient bearing shell means disposed around said ball head and encased in said housing and having a flanged portion disposed in said recessed portion parallel to said shoulder and transversely of the axis of the ball head, and a closure cap secured in the upper portion of said housing over the free end of said ball head having a depending portion extending into said housing, and defining a shoulder against which said flanged portion bears, said bearing shell means comprising a resilient portion presenting spherical inner and outer surfaces disposed with tolerance in the space between said lower spherical surface and said ball head.

2. A ball and socket joint comprising a ball headed rod, a housing enclosing the ball head and defining a recessed portion presenting a shoulder proximate the equatorial region of the ball, a lower spherical surface having a bottom aperture permitting angular movement of said rod and having a substantially greater spherical diameter than said ball head and being spaced therefrom, resilient bearing shell means disposed around said ball head and encased in said housing and having a flanged portion disposed in said recessed portion parallel to said shoulder and transversely of the axis of the ball head, and a closure cap secured in the upper portion of said housing over the free end of said ball head having a depending portion extending into said housing, and defining a shoulder against which said flanged portion bears, said bearing shell means comprising a resilient portion presenting spherical inner and outer surfaces disposed with tolerance in the space between said lower spherical surface and said ball head, said resilient bearing shell means comprising upper and lower bearing shells having said flanged portion of one in engagement with the flanged portion of the other.

References Cited in the file of this patent

UNITED STATES PATENTS

| | | |
|---|---|---|
| 1,073,264 | Meyer et al. | Sept. 16, 1913 |
| 2,527,787 | Berger | Oct. 31, 1950 |

FOREIGN PATENTS

| | | |
|---|---|---|
| 273,945 | Germany | May 1, 1914 |
| 507,025 | Great Britain | June 8, 1939 |
| 554,426 | Germany | July 9, 1932 |